United States Patent [19]

Machleder et al.

[11] 4,048,081

[45] Sept. 13, 1977

[54] MULTIPURPOSE FUEL ADDITIVE

[75] Inventors: Warren H. Machleder, Blue Bell; Joseph M. Bollinger, North Wales, both of Pa.

[73] Assignee: Rohm and Haas Company, Philadelphia, Pa.

[21] Appl. No.: 671,462

[22] Filed: Mar. 29, 1976

Related U.S. Application Data

[63] Continuation-in-part of Ser. No. 536,074, Dec. 24, 1974, abandoned.

[51] Int. Cl.$^2$ .............................................. C10M 1/32
[52] U.S. Cl. ..................................... 252/51.5 R; 44/75
[58] Field of Search .............. 260/570.7 OH, 570.7 R; 44/72, 78, 73, 74, 75, 58; 252/51.5 R

[56] References Cited

U.S. PATENT DOCUMENTS

| | | | |
|---|---|---|---|
| 2,695,293 | 11/1954 | Swain | 260/570.7 OH |
| 3,038,856 | 6/1962 | Milligan | 260/570.7 OH |
| 3,076,819 | 2/1963 | Heise | 260/570.7 OH |
| 3,888,898 | 6/1975 | Koppe et al. | 260/570.7 OH |
| 3,960,965 | 6/1976 | Battersby et al. | 44/72 |
| 3,969,512 | 7/1976 | Koppe et al. | 260/570.7 OH |

*Primary Examiner*—Daniel E. Wyman
*Assistant Examiner*—Mrs. Y. Harris-Smith

[57] ABSTRACT

A new multipurpose carburetor detergent for addition to gasoline is disclosed and claimed. The novel multipurpose detergent material shows excellent activity as a carburetor detergent, induction system detergent (% deposit reduction), combustion chamber detergency and, in addition, provides effective rust inhibition when used in automotive gasoline fuels at low concentrations. The new product is a polyisobutene phenol/epichlorohydrin/amine adduct. The novel product may also be described as the reaction product of a polyisobutene phenol with epichlorohydrin followed by amination with ethylene diamine.

11 Claims, No Drawings

MULTIPURPOSE FUEL ADDITIVE

This application is a continuation-in-part application of our earlier filed and copending application Ser. No. 536,074 filed December 24, 1974, now abandoned.

This invention relates to a novel multipurpose detergent for addition to gasoline. The novel multipurpose detergent material shows excellent activity as a carburetor detergent, induction system detergent (% deposit reduction), combustion chamber detergency and, in addition, provides effective rust inhibition when used in automotive gasoline fuels at low concentrations, in the range of about 20 to 600 ppm (parts per million) and, more preferably, in the range of about 60 to 400 ppm. The new product is a polyisobutene phenol/epichlorohydrin/amine adduct. The novel product may also be described as, for example, the reaction product of a polyisobutene phenol with epichlorohydrin followed by amination with ethylene diamine, or with some other polyamine.

It is an object of the present invention to provide a detergent motor fuel which will have certain carburetor detergent properties and which will clean up and maintain the cleanliness of the carburetor and also the remainder of the fuel induction system, such as the valves and ports, and reduce the octane requirement increase of an internal combustion engine by reducing the buildup of combustion chamber deposits. It is another object of the present invention to provide a detergent fuel which will maintain a low level of hydrocarbon and carbon monoxide exhaust gas emissions and which will avoid the use of phosphorus-containing additives. It is still a further object of the present invention to provide a detergent fuel which has other desirable properties, such as rust and corrosion protection, water demulsibility properties, anti-icing properties, etc. It is a further object additive or additive combination effective in inhibiting the formation of intake valve deposits in addition to being effective as carburetor detergents and which can be used at relatively low concentrations (and thus at relatively low cost), for example, at a treating level of about 20 to 600 parts per million (ppm on a weight basis in the gasoline) and, more preferably, 60 to 400 ppm.

There are, of course, other detergent motor fuel compositions available today, but they generally suffer from one or more deficiencies. Either they are used at very high concentrations, for example, something of the order of 4,000 ppm; or if used at the use levels in which we are interested, the available formulations suffer from one or more defects.

It has been conceived and demonstrated that the reaction products of certain alkylphenols, epichlorohydrin and amines show excellent carburetor, induction system and combustion chamber detergency and, in addition, provide effective rust inhibition when used in automotive gasoline fuels at low concentrations, i.e., between about 20 to 600 ppm and, more preferably, between about 60 to 400 ppm. In addition to their activity as fuel additives, these compounds are also potential ashless rust inhibitors and dispersants for use in lubricating oils. Our preferred product is the N,N¹ Bis[3-(p-H35-polyisobutylphenoxy)-2-hydroxypropyl]ethylene diamine. The PIB is our abbreviation for a polyisobutene generically of any molecular weight. The H35 is the commercial designation for Amoco's polyisobutene of Mn~670. The structurel formula for the preferred product is as follows:

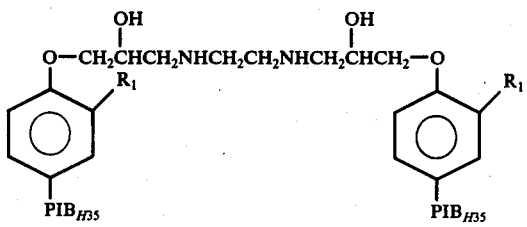

The $PIB_{H35}$ component (which can also be written simply as R) may have a number average molecular weight (Mn) of about 500 to 2000 and, more preferably, about 600 to 1500. Optionally, some of the polyisobutene may be in the ortho position where it is denominated $R_1$. $R_1$ may, therefore, simply be the same as R, i.e., a polyisobutene radical of number average molecular weight of about 500 to 2,000 and, more preferably, about 600 to 1,500; or $R_1$ may alternatively simply be hydrogen, i.e., H.

The gasoline additive or additives or gasoline fuel additive or additives of the present invention act to control spark plug fouling and thus help to keep the spark plugs relatively clean and relatively free of any deposits.

The novel amine product or adduct or adducts used in this case may be described, as, for example, the reaction product of a polyisobutene phenol with epichlorohydrin followed by amination with ethylene diamine, or some other polyamine.

It is recognized that the alkylation of a polyamine is a reaction which in general leads to complex mixtures of products. The term "Preferred Product", as used throughout the specification, should be recognized by one skilled in the art as encompassing all of the amine adduct product(s) derived from the reaction sequence as described hereinabove. For the sake of illustration and brevity, only one of the possible reaction products has been depicted in this disclosure; however, the preferred product in the case where $n = 1$ can be a mixture of (a) and (b), or (a) or (b) taken singly. In other words, on a parts per 100 parts basis, (a) can vary from 1 to 99 parts and (b) can vary from 99 to 1 part; or there can be 100 parts of (a) or 100 parts of (b), all parts being on a weight basis. In the case where n is greater than 1, more complex mixtures can form where alkylation can occur at any of the available nitrogen sites; such cases are taken to be covered by the present disclosure. The overall amount for use in gasoline of the new product or amine adduct(s) remains the same no matter what the internal proportion or ratio or amount of (a) or (b) is.

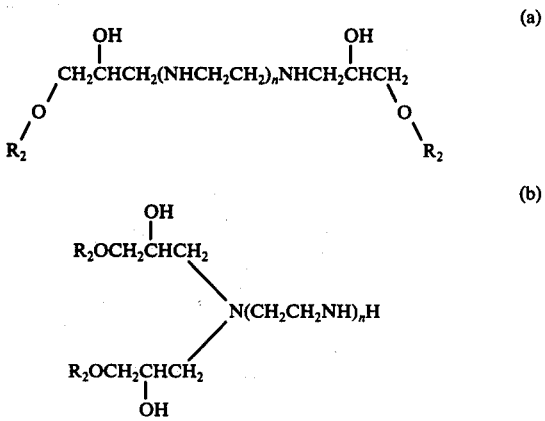

where n = 1 to 5 and $R_2$ is a polyisobutyl or a polyisopropyl substituted benzene ring as hereinbefore disclosed.

According to one aspect of the present invention, therefore, we provide a normally liquid, multifunctional additive composition for addition to a leaded, low lead, manganese or unleaded gasoline, i.e., to a distillate hydrocarbon fuel comprising a major proportion of a hydrocarbon base fuel distilling within the gasoline distillation range. This additive provides carburetor, induction system and combustion chamber detergency, rust inhibition and good handling properties to a higher degree than normally found with typical current first generation multipurpose carburetor detergents of the alkyl ammonium phosphate or polyolefin succinimide type. The increased performance we are seeking is necessitated in part by the advent of emissions control hardware which must remain deposit-free if the new automobiles are to remain within the EPA emissions specifications for 50,000 miles as required for vehicle certification.

Although there are many carburetor detergents on the market, to our knowledge, only one, Chevron F-310, can be classified as a true second generation additive possessing the broad based activity we are seeking and have achieved. However, F-310 is recommended at a high treating level of 4,000 ppm, and that may exceed the industry's handling or economic capabilities. Therefore, we feel there is currently no additive available which is completely acceptable in terms of economics, treating level and performance.

The preferred chemical gasoline additive compound of this invention is prepared by the following reaction sequence:

a. Phenol is alkylated with polyisobutene, i.e., polyisobutylene, of Mn~670 (Amoco H35) using an acid catalyst.

b. The polyisobutylphenol is converted to the sodium phenoxide using sodium hydroxide and then reacted with epichlorohydrin.

c. Two moles of the epichlorohydrin adduct are reacted with ethylene diamine to form the desired product.

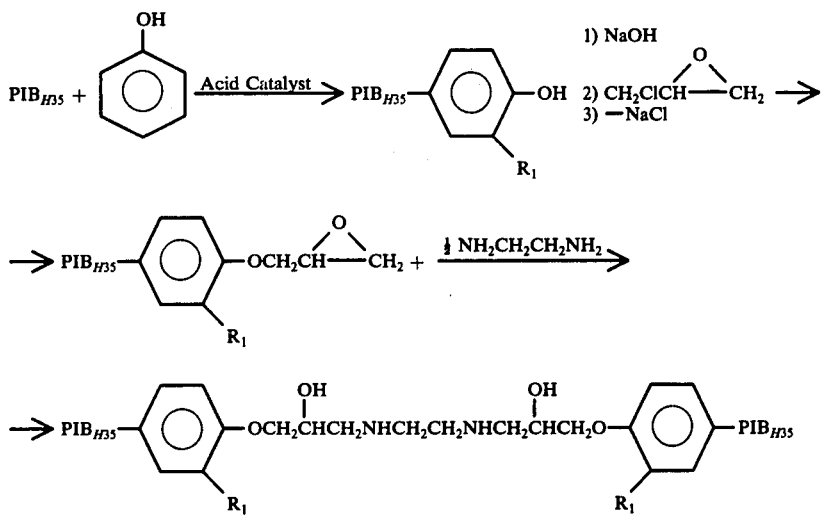

(Preferred Product of this invention and application, where $R_1$ is $PIB_{H35}$ or H.)

Our experience with a large number of product compounds of this type, as shown in the reaction scheme above, indicates that a polyisobutene in the molecular weight range of 500-2000 and a polyamine of the ethylene diamine, diethylene triamine type produces the best balance of properties in terms of detergency, rust inhibition and handling.

Table I presents data comparing the preferred product of the present case with Chevron F-310. (The essential component in Chevron F-310 is believed to be a polybutene amine.) The data which indicate the percent reduction in deposits versus untreated gasoline shows that the preferred product greatly improves the performance of untreated gasoline and provides performance comparable to F-310 at a much reduced treating level.

TABLE I

| | PERFORMANCE OF SECOND GENERATION CARBURETOR DETERGENT | | | |
|---|---|---|---|---|
| Additive | Recommended Treating Level, lbs./100 bbls** | ASTM-D665 Rust Test % Area Rusted | Carburetor Detergency Blowby Test (A) % Deposit Reduction | Induction System Test (B) Single Cylinder % Deposit Reduction |
| Control Base Gasoline | — | 100 | 0 | 0 |
| Chevron F-310 | 1000 | 0 | 96 | ~99 |
| *PP (Amine Adduct) | 75 | 0-5 | 95 | 94 |

*The Preferred Product of this invention and application as shown in the reaction scheme above on page 7, and where $R_1$ is H or $PIB_{H35}$
**Barrels of gasoline (bbls)

Table II presents data showing the ability of the preferred product of the present invention to control the increase in the octane number requirement of an engine. Although the mechanism of activity is not firmly established, the additive presumably works by preventing the buildup of deposits in the combustion chamber.

TABLE II

OCTANE NUMBER REQUIREMENT INCREASE

| Additive | Treating Level, lbs./100 bbls in Gasoline (Nonleaded) | Octane Number (C) Requirement Increase |
|---|---|---|
| Untreated Base Gasoline | — | 10 |
| Preferred Product (PP) (Amine Adduct where $R_1$ is H or $PIB_{H35}$) | 75 | 5 |

As measured by the Combustion Chamber Deposit Engine Test

The Blowby Carburetor Detergency Test above, showing % deposit reduction, is described below. MS-08 gasoline is used in the Blowby Carburetor Detergency Keep Clean Engine Test (% deposit reduction). Phillips J Reference Fuel, an unleaded fuel, is used in the Induction System Test, single cylinder, % deposit reduction, and also in the Combustion Chamber Deposit Engine Test.

ENGINE TEST EVALUATION OF MULTIPURPOSE CARBURETOR DETERGENTS

A. BLOWLY CARBURETOR DETERGENCY KEEP CLEAN ENGINE TEST

Engine Test Procedure

The Blowby Carburetor Detergency Keep Clean Engine Test (BBCDT-KC) measures the ability of a gasoline additive to keep clean the carburetor throttle body area, and is run in a 1970 Ford 351 CID V-8 engine equipped by means of a special Y intake manifold with two one-barrel carburetors, which can be independently adjusted and activated. With this arrangement, a separate test fuel can be evaluated by each carburetor which feeds four of the eight cylinders via the non-interconnected intake manifold. The carburetors are modified with removable aluminum sleeves in order to facilitate weighing of the deposits which accumulate in the throttle body area. The severity of the test is adjusted to an appropriate level by recycling the entire amount of blowby gases, approximately 90–110 c.f.h., to the top of the air cleaner so that each carburetor receives an equal volume of these gases. Equal intake mixture flow through each carburetor is adjusted during the first hour of operation of means of intake manifold differential pressure and CO exhaust gas analysis. The following test cycle and operating conditions are employed:

| Test Cycle | |
|---|---|
| Phase I | 650 engine rpm, 8 min. |
| Phase II | 3000 engine rpm, 1 min. |
| Test duration, hrs. | 10 |
| Intake air, °F. | 135 ± 10 |
| Jacket water, °F. | 190 ± 10 |
| Engine oil-sump, °F. | 210 ± 10 |
| Percent CO in exhaust | 3.0 ± 0.2 |
| Blowby, c.f.h. | 9 – 110 |

The weight (mgs.) of deposits accumulated on the aluminum sleeve is measured, and the average value of four tests per additive or additive mixture is reported.

The gasoline used in the BBCDT-KC test is an MS-08 gasoline having the following properties:

| | |
|---|---|
| Gravity: | |
| API | 59.7 |
| Sp. gr. at 60° F. | 0.74 |
| ASTM D-86 distillation, °F.: | |
| I.B.P. | 93 |
| 10% | 123 |
| 50% | 205 |
| 90% | 348 |
| E.P. | 405 |
| Percent recovered | 98 |
| Percent residue | 1 |
| Percent loss | 1 |
| Percent sulfur | 0.11 |
| Lead, gm./gal. | 3.08 |
| FIA composition: | |
| Aromatics, percent | 23.1 |
| Olefins, percent | 20.0 |
| Saturates, percent | 56.9 |
| Oxidation stability, minutes | 600+ |
| ASTM gum (unwashed), mg./100 ml. | 1.0 |
| Research octane number | 95.5 |
| Percent H | 13.10 |
| Percent C | 86.61 |
| H/C | 1.80 |

The Induction System Deposit Test, showing % deposit reduction, is described below.

B. INDUCTION SYSTEM DEPOSIT ENGINE TEST

Engine Test Procedure

The Induction System Deosit Test (ISDT) which is used to evaluate the ability of gasoline additives or mixtures of additives to control induction system deposits, is run using a new air-cooled, single cylinder, 4 cycle, 2.5 H.P. Briggs and Stratton engine for each test. The engine is run for 150 hours at 3,000 rpm and 4.2 ft. lbs. load, with a 1 hour shutdown every 10 hours to check the oil level. Carbon monoxide exhaust emission measurements are made each hour to insure that a constant air to fuel (A/F) ratio is being maintained.

Upon completion of a test run, the engine is partially disassembled, and the intake valve and port are rated and valve and ports deposits are collected and weighed.

The test procedure used to measure octane number requirement increase, the Combustion Chamber Deposit Engine Test, is described below.

C. COMBUSTION CHAMBER DEPOSIT ENGINE TEST

Engine Test Procedure

The Combustion Chamber Deposit Engine Test (CCDET) is used to evaluate the ability of a gasoline additive or mixture of additives to control or reduce the octane number requirement increase (ONRI) in an internal combustion engine. The test is run using a 1972 Chevrolet 350 CID V-8 engine equipped with a two-barrel carburetor and a 1972 Turbo Hydromatic 350 transmission which is connected to a 1014-2 WIG dynamometer equipped with a 200.3 lb.-ft.$^2$ inertia wheel. The following test cycle and operating conditions are employed and are intended to simulate an urban taxi cab.

| Test Cycle: | |
|---|---|
| Phase I | Start - idle, 650–750 rpm |
| Phase II | Accelerate - 1 to 2 shift, 5.5 sec., 2900–3000 rpm |
| Phase III | Accelerate - 2 to 3 shift, 9.5 sec., 2800–2900 rpm |
| Phase IV | 3rd gear, 10.0 sec., 2600 rpm |
| Phase V | Decelerate to idle, 15.0 sec. |
| Test duration | 200 hrs. |

| -continued | |
|---|---|
| Test Cycle: | |
| Fuel consumption | 1000 gal. (Phillips "J" Reference Fuel, an unleaded fuel) |
| Intake air, ° F. | Ambient |
| Jacket water, ° F. | 180 |
| Engine oil-sump, ° F. | 220 ± 10 |

Octane number requirement is determined at 24 hrs. interval under the following engine conditions: transmission in 3rd gear with an output shaft speed controlled at 1500 rpm and the engine throttle wide open. The octane number requirement of the engine is determined at trace knock in terms of primary reference fuels; i.e., the engine is run on a series of blends and isooctane and n-heptane of known octane number until audible knock is perceived. The lowest standardized octane number blend at which the engine does not knock is recorded as the octane number requirement. Octane number requirement increase is then the difference between the initial octane number requirement and the final octane number requirement for a particular test.

The (A) test procedure, i.e., the description of the Blowby Carburetor Detergency Keep Clean Engine Test, beginning at line 22 of page 8 of the specification, refers to the results shown in Table I, column 4, on page 7 of the specification. The (B) test procedure, i.e., the description of the Induction System Deposit Engine Test, beginning at the top of page 11 of the specification, refers to the results shown in Table I, column 5, on page 7 of the specification. The (C) test procedure, i.e., the description of the Combustion Chamber Deposit Engine Test, beginning at line 20 of page 11 of the specification, refers to the results shown in Table II, column 3, on page 8 of the specification.

One of the unique features of the products of this invention is that they are one of the few non-ionic compounds that provide a high degree of rust inhibition. This is an important feature in a gasoline additive since ionic rust inhibitors, i.e., carboxylic and phosphoric acid salts, tend to aggravate the problem of induction system deposits. In addition, a non-ionic or ashless rust inhibitor is key component in formulating an ashless engine oil. Therefore, the products of this invention may find utility as lubricant additives as well as gasoline fuel additives. The general structure of the novel compounds of this invention may be expressed as follows:

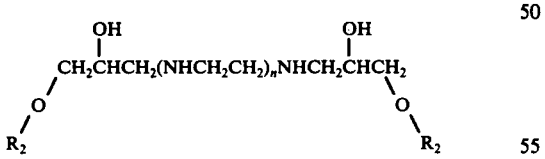

wherein n is an integer of from 1 to 5, and wherein $R_2$ is an alkyl substituted benzene ring, and wherein the alkyl substituent (or substituents) is polyisobutyl or polyisopropyl of about 500 to 2,000 molecular (number average) weight. In Example I and throughout the specification and claims, all parts and percentages are by weight unless otherwise noted.

EXAMPLE 1 (Part A) Polyisobutene H35 Phenol Reaction:

(Part A) Polyisobutene H35 Phenol

Reaction:

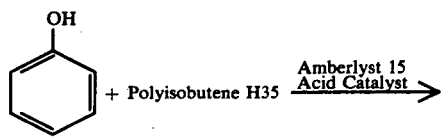

M.W. 94  ~ 660  ~ 754
(M.W. = Molecular Weight)  (Theoretical M.W.)

The product is actually a mixture of alkylated phenols with an average molecular weight of 548 based upon oxygen analysis (2.92%) and 556 calculated from UV spectral parameters.

The experimental procedure is described below.

To a 5-l. 3-necked flask equipped with a thermometer, mechanical stirrer, and reflux condenser with Dean-Stark trap was charged 1920 g. (2.9 moles) of Polyisobutene H35 (Amoco), 564 g. (6 moles) of phenol, 200 g. of Amberlyst 15 acid catalyst, and 550 ml. of hexane. The stirred mixture was heated at reflux (pot temperature 100°–107° C.) under a nitrogen atmosphere for 24 hours, during which time 5.4 ml. of water had separated. After cooling to 60°–80° C., the mixture was filtered to remove the resin beads, the latter being washed with hexane, and the filtrate subjected to vacuum concentration with a pot temperature of 160° C. There was obtained 1971.4 g. of product residue having an oxygen content of 2.92% (theoretical: 2.12%).

(Part B) 1,2-Epoxy-3-[p-(H35-polyisobutyl)phenoxy] propane
Reaction:

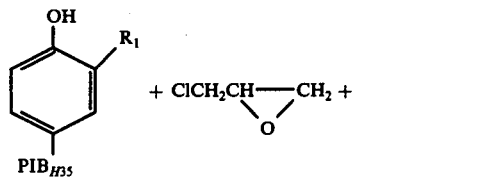

M.W. ~ 754  92.5  40

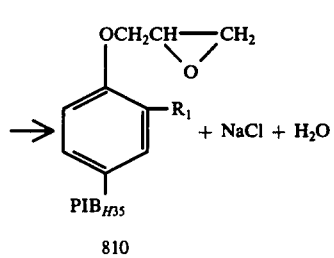

810

To a 5.l. 3-necked flask fitted with a thermometer mechanical stirrer, addition funnel and reflux condenser was charged 973 g. (1.75 moles based upon 2.92% oxygen) of Polyisobutene H35 Phenol, 72 g. (1.75 moles based upon 97.4% assay) of sodium hydroxide pellets, 450 ml. of 2-propanol and 450 ml. of toluene. The stirred mixture was heated under a nitrogen atmosphere at 84°-90° C. for one hour to effect the dissolution of the base. Epichlorohydrin (161.9 g., 1.75 moles) was then added dropwise at 60° c. during 2.5 hours, followed by a hold period at 70° C. The reaction mixture was then cooled, filtered, and the salt (107 g. dry) washed with toluene. The filtrate was stripped (100° C./15 mm.) to give 1075.3 g. of product residue.

(Part C) N,N¹-Bis 3-(p-H35-polyisobutylphenoxy)-2-hydroxypropyl ethylene diamine
Reaction:

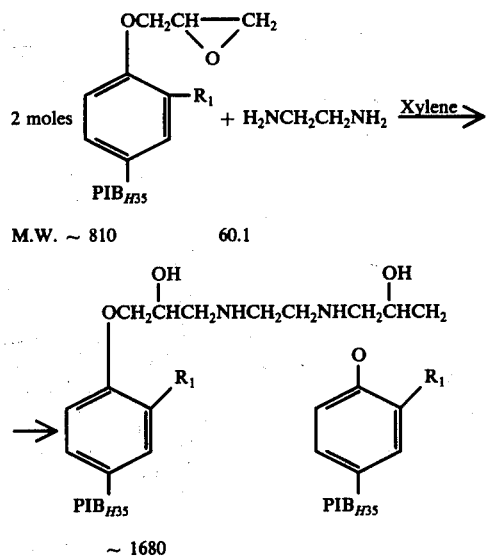

A mixture of 1018.4 g. of the above epoxide, 122.6 g. (2.04 moles) of ethylene diamine and xylene (700 ml.) was heated at reflux (131°-6° C.) with stirring under a nitrogen atmosphere for 18 hours. After vacuum stripping (18 mm., pot temperature of 120° C.), there was obtained 1053.4 g. of turbid residue which was filtered through a bed of Celite 545 in a steam-heated Buchner funnel to give clear, yellow viscous product. The mixture obtained in this syntheses can be the N,N'diadduct; the N,N diadduct and some N or N' monoadduct.

Preferably, the mixed product prepared in this way is shown below:

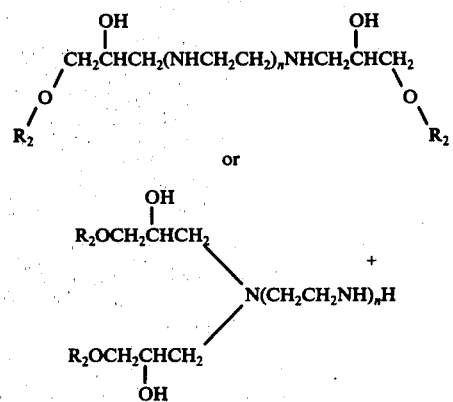

where $n=1$ to 5 and $R_2$ is a polyisobutyl or a polyisopropyl substituted benzene ring as hereinbefore disclosed. The product prepared in this way had 1.26% basic N (1.67% theory and 5.26% 0 (3.81% theory).

The gasoline additive or additives or gasoline fuel additive or additives of the present invention act to control spark plug fouling and thus help to keep the spark plugs relatively clean and relatively free of any deposits.

The novel amine product or adduct or adducts used on this case may be described as, for example, the reaction product of a polyisobutene phenol with epichlorohydrin followed by amination with ethylene diamine, or some other polyamine.

It is recognized that the alkylation of a polyamine is a reaction which in general leads to complex mixtures of products. The term "Preferred Product," as used throughout the specification, should be recognized by one skilled in the art as encompassing all of the amine adduct product(s) derived from the reaction sequence as described hereinabove. For the sake of illustration and brevity, only one of the possible reaction products has been depicted in this disclosure; however, the preferred product in the case where $n=1$ can be a mixture of (a) and (b), or (a) or (b) taken singly. In other words, on a parts per 100 parts basis, (a) can vary from 1 to 99 parts and (b) can vary from 99 to 1 part; or there can be 100 parts of (a) or 100 parts of (b), all parts being on a weight basis. In the case where n is greater than 1, more complex mixtures can form where alkylation can occur at any of the vailable nitrogen sites; such cases are taken to be covered by the present disclosure. The overall amount for use in gasoline of the new product or amine adduct(s) remains the same no matter what the internal proportion or ratio or amount of (a) or (b) is.

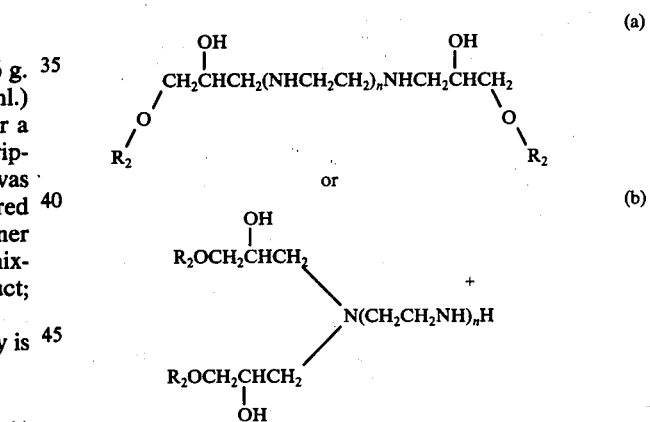

where $n=1$ to 5 and $R_2$ is a polyisobutyl or a polyisopropyl substituted benzene ring as hereinbefore disclosed.

This application is related to another application, Ser. No. 536,072, filed Dec. 24, 1974, now abandoned, said other application entitled "Multipurpose Fuel Additive Mixture or Blend", the disclosure of which is incorporated herein by reference.

This application is also related to another application, Ser. No. 536,075, filed Dec. 24, 1974, now abandoned, said application entitled "Multipurpose and Detergent Fuel Additive Blend or Mixture," the disclosure of which is incorporated herein by reference.

The products of this case can be used as detergent additives for use in gasoline for use in two and four cycle spark ignition engines. In the case of two cycle engines the additive can be blended into the oil as well as the gasoline. In addition the additives of this invention can be blended into diesel fuel for use in diesel engines, ie, compression ignition engines, for controlling deposit buildup on the diesel injector nozzle and piston. It should be understood that as used in this application wherever polyisobutyl or polyisobutene is used, polyisopropyl or polyisopropene can be used as equivalents.

What is claimed is:

1. A multipurpose gasoline or lubricating oil additive, comprising an adduct selected from compounds, and mixtures thereof, of the formulas:

and

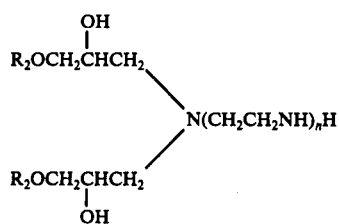

wherein $n$ is 1–5 and $R_2$ is a benzene group having at least one polyalkylene substituent.

2. An additive as in claim 1 wherein the polyalkylene substituent has a number average molecular weight of about 500 to 2,000.

3. An additive as in claim 2 wherein the polyalkylene substituent is polyisobutyl or polyisopropyl.

4. An additive as in claim 2 wherein adduct (a) is:

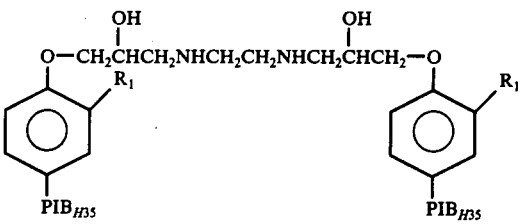

and adduct (b) is:

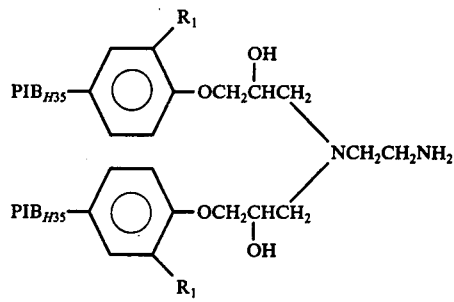

wherein $PIB_{H35}$ is polyisobutyl of number average molecular weight of about 670 and $R_1$ is $PIB_{H35}$ or hydrogen.

5. A composition comprising a mixture of a major proportion of gasoline or lubricating oil and a minor detergent amount of the additive of claim 1.

6. A composition comprising a mixture of a major proportion of gasoline or lubricating oil and a minor detergent amount of the additive of claim 2.

7. A composition comprising a mixture of a major proportion of gasoline or lubricating oil and a minor detergent amount of the additive of claim 3.

8. A composition comprising a mixture of a major proportion of gasoline or lubricating oil and a minor detergent amount of the additive of claim 4.

9. A composition comprising a mixture of a major proportion of gasoline and about 20–600 ppm of the additive of claim 1.

10. A composition comprising a mixture of a major proportion of gasoline and about 20–600 ppm of the additive of claim 3.

11. A composition comprising a mixture of a major proportion of gasoline and about 20–600 ppm of the additive of claim 4.

* * * * *